(12) United States Patent
Pham et al.

(10) Patent No.: US 10,155,364 B2
(45) Date of Patent: Dec. 18, 2018

(54) HIGH OPTICS MACHINE DIRECTION ORIENTED LABEL FACESTOCK

(71) Applicant: Avery Dennison Corporation, Glendale, CA (US)

(72) Inventors: Hoang T. Pham, Painesville, OH (US); Yatin Patil, South Hadley, MA (US)

(73) Assignee: Avery Dennison Corporation, Glendale, CA (US)

( * ) Notice: Subject to any disclaimer, the term of this patent is extended or adjusted under 35 U.S.C. 154(b) by 0 days.

(21) Appl. No.: 15/142,232

(22) Filed: Apr. 29, 2016

(65) Prior Publication Data

US 2016/0318288 A1    Nov. 3, 2016

Related U.S. Application Data

(60) Provisional application No. 62/155,511, filed on May 1, 2015.

(51) Int. Cl.
*B32B 27/08* (2006.01)
*B32B 7/06* (2006.01)
(Continued)

(52) U.S. Cl.
CPC ............. *B32B 27/08* (2013.01); *B32B 7/06* (2013.01); *B32B 7/12* (2013.01); *B32B 27/32* (2013.01);
(Continued)

(58) Field of Classification Search
CPC ........ C08L 23/04; C08L 23/10; Y10T 428/14; Y10T 428/28; Y10T 428/2848;
(Continued)

(56) References Cited

U.S. PATENT DOCUMENTS 5,272,236 A    12/1993    Lai et al.
6,127,043 A    10/2000    Lange
(Continued)

FOREIGN PATENT DOCUMENTS

EP    0563796    1/1998
WO    03/040442    5/2003

OTHER PUBLICATIONS

International Search Report and Written Opinion dated Jul. 15, 2016 issued in corresponding IA No. PCT/US2016/030006 filed Apr. 29, 2016.

(Continued)

*Primary Examiner* — Patricia L. Nordmeyer
(74) *Attorney, Agent, or Firm* — Avery Dennison Corporation

(57) ABSTRACT

Machine direction oriented coextruded multilayer film structures for use as labelstock and die cut adhesive labels are described. The labelstocks comprise extruded machine direction oriented multilayer films and an adhesive layer. The multilayer film structures include skin layers made from a mixture of 70% to about 99.9% by weight of at least one propylene polymer, and from about 0.1% to about 20% by weight of at least one ethylene polymer, or from about 0.1% to about 25% by weight of at least one propylene polymer, and from about 75% to about 99.9% by weight of at least one ethylene polymer. The coextruded multilayer films are stretch oriented in the machine direction at a temperature at about or above the melting temperature of the polyethylenes and optionally include an adhesive layer and release liner.

52 Claims, 4 Drawing Sheets

(51) Int. Cl.
  *B32B 27/32* (2006.01)
  *B32B 7/12* (2006.01)
  *C08L 23/08* (2006.01)
  *C08L 23/12* (2006.01)
  *B29C 47/06* (2006.01)
  *B29C 47/00* (2006.01)
  *B29K 23/00* (2006.01)

(52) U.S. Cl.
  CPC ......... *C08L 23/0815* (2013.01); *C08L 23/12* (2013.01); *B29C 47/0057* (2013.01); *B29C 47/065* (2013.01); *B29K 2023/0633* (2013.01); *B29K 2023/0641* (2013.01); *B29K 2023/12* (2013.01); *B29K 2995/0026* (2013.01); *B29K 2995/0063* (2013.01); *B32B 2255/10* (2013.01); *B32B 2255/205* (2013.01); *B32B 2264/105* (2013.01); *B32B 2270/00* (2013.01); *B32B 2307/406* (2013.01); *B32B 2307/4023* (2013.01); *B32B 2307/412* (2013.01); *B32B 2307/414* (2013.01); *B32B 2307/516* (2013.01); *B32B 2307/538* (2013.01); *B32B 2307/72* (2013.01); *B32B 2323/04* (2013.01); *B32B 2323/10* (2013.01); *B32B 2519/00* (2013.01)

(58) Field of Classification Search
  CPC ..... Y10T 428/24959; Y10T 428/31913; B32B 27/08; B32B 27/32; B32B 27/06; B32B 27/12; B32B 2255/205; B32B 2255/10; B32B 2264/105; B32B 2519/00; B32B 2307/538; B32B 2307/4023; B32B 2307/406; B32B 2307/412; B32B 2307/414; B32B 2307/516; B32B 2307/72; B32B 2323/04; B32B 2323/10; B32B 2270/00; B29C 47/065; B29C 47/0057; B29K 2023/0633; B29K 2023/0641; B29K 2023/12; B29K 2995/0063; B29K 2995/0026
  See application file for complete search history.

(56) References Cited

U.S. PATENT DOCUMENTS

| | | |
|---|---|---|
| 6,197,419 B1 | 3/2001 | Hyde et al. |
| 6,245,857 B1 | 6/2001 | Shamshoum et al. |
| 7,318,961 B2 | 1/2008 | Peijs et al. |
| 7,722,960 B2 | 5/2010 | Mills et al. |
| 7,927,712 B2 | 4/2011 | Mills et al. |
| 8,541,077 B2 | 9/2013 | Patel et al. |
| 2003/0041962 A1* | 3/2003 | Johnson ............... B32B 27/08 156/266 |
| 2012/0060997 A1 | 3/2012 | Mitchell et al. |
| 2013/0059119 A1 | 3/2013 | Campeau et al. |
| 2014/0106638 A1 | 4/2014 | Homma et al. |
| 2014/0205847 A1 | 7/2014 | Falla |
| 2015/0190988 A1 | 7/2015 | Saxberg et al. |
| 2015/0259586 A1 | 9/2015 | Kapur et al. |

OTHER PUBLICATIONS

International Preliminary Report on Patentability dated Nov. 16, 2017 issued in corresponding IA No. PCT/US2016/030006 filed Apr. 29, 2016.

* cited by examiner

HIGH OPTICS MACHINE DIRECTION ORIENTED LABEL FACESTOCK

CROSS-REFERENCE TO RELATED APPLICATION

The present application claims the benefit of U.S. Provisional Patent Application No. 62/155,511 filed May 1, 2015, which is incorporated herein by reference in its entirety.

FIELD

This subject matter relates to multilayer film structures and adhesive label facestocks that are conformable, printable and die-cuttable, and to a process for preparing such multilayer film structures, adhesive label facestocks, and die-cut labels.

BACKGROUND

It has long been known to manufacture and distribute pressure-sensitive adhesive labelstock for labels by providing a facestock material for the label or sign, backed by a layer of pressure sensitive adhesive ("PSA"), which in turn, generally is covered by a release liner or carrier. The liner or carrier protects the adhesive during shipment and storage and allows for efficient handling of an array of individual labels after the labels are die-cut and the matrix is stripped from the layer of facestock material, and up to the point where the individual labels are dispensed in sequence on a labeling line, for example when applied to a substrate. During the time from die-cutting to dispensing, the release liner or carrier remains uncut and may be rolled and unrolled for storage, transit, and deployment of the array of individual labels carried thereon.

Failure of the labels to reliably dispense from the release liner or carrier for application to the substrate is typically characterized by the label following the carrier around a peel plate without dispensing, releasing, or "standing-off" from the carrier. Such failure to dispense is believed to be associated with excessive release values between the label facestock material and the liner. Dispensability also is dependent upon the stiffness of the facestock, wherein insufficient stiffness results in a failure of the facestock to dispense from the carrier. Failure to dispense due to lack of label stiffness may also be characterized by the wrinkling of the label at the dispensing speed as it is transferred from the carrier to the substrate. Another particular need in labeling applications is the ability to apply polymeric-film labels at high line speeds, since increased line speed has obvious cost saving advantages.

There is also a need for down-gauging of label films in order to improve the cost performance ratio of labelstock. Down-gauging of label films to make them thinner is associated with reduced strength and reduced stiffness of the film. A disadvantage of down-gauging of films is that the stiffness in the machine direction of the film will become too low to guarantee good dispensing of the labels. This problem has been addressed by stretch orienting the film in the machine direction (MD) and/or the cross direction (CD), or by utilizing materials having a higher modulus of elasticity and, hence, higher stiffness.

Polypropylenes, and in particular biaxially oriented polypropylene (BOPP), have been utilized successfully in down-gauging applications since polypropylene is relatively inexpensive and exhibits sufficient stiffness to dispense well. However, polypropylenes in general exhibit relatively high tensile modulus values in both machine-direction and cross-direction which results in labels that are not very conformable, resulting in unsatisfactory labeling of contoured substrates. Additionally, polypropylenes are not easily printable with UV based inks, which are most commonly used to print on pressure sensitive adhesive labels.

When films with incompatible polypropylene-polyethylene (PP-PE) blends are used, resulting films tend to be hazy and not clear. Furthermore, when the PP-PE films are stretched to be machine direction oriented (MDO), an outer surface of the films tend to have significant surface roughness after the stretch orienting process. Surface roughness of an outer surface of the films plays a huge role in optical properties of the films such as MD gloss, CD gloss, haze and clarity. As such, these PP-PE blended MDO films have poor film optics. In particular, if surface features of the films have a height that approaches the wavelength of visible light, the features will scatter light and reduce film optics.

Current PP-PE blended MDO films are not sufficiently clear, and are significantly hazy. This haziness can be reduced by applying a lacquer coating to the outer surface of the film. However, such top-coatings require additional processing steps and cost; and even with such top-coatings, it has been observed that print aesthetics, such as color saturation, are not satisfactory. Unsatisfactory print aesthetics is especially apparent when printing with metallure inks, which do not "pop" from the background created by the surface of the MDO films.

Therefore, a need exists for high optical, clear MDO films having high gloss that provide satisfactory print aesthetics and have sufficient stiffness for high speed dispensing.

SUMMARY

The difficulties and drawbacks associated with previously known MDO labelstock are addressed in the present multilayer MDO film structures and related combinations and methods.

The present subject matter relates to a MDO multilayer film structure including a core layer and two skin layers. The skin layers have low surface roughness, which increases gloss and transmittance of the film structure, and also provides increased print aesthetics, such as "pop" of printed indicia, for the structure.

In one aspect, the present subject matter provides a coextruded machine direction oriented multilayer film structure comprising a core layer and two skin layers. The core layer includes a mixture of polypropylene and polyethylene, and has a first side and a second side opposite from the first side. A first skin layer of the two skin layers is positioned on the first side of the core layer, and a second skin layer of the two skin layers is positioned on the second side of the core layer. Each of the two skin layers comprise i) from about 70% to about 99.9% by weight of at least one propylene polymer, and from about 0.1% to about 30% by weight of at least one ethylene polymer, or ii) from about 0.1% to about 25% by weight of at least one propylene polymer, and from about 75% to about 99.9% by weight of at least one ethylene polymer. The two skin layers each include an exposed surface opposite from the core layer, the exposed surface having an average surface roughness (Sq) as measured by the root mean square height of the exposed surface of less than about 170 nanometers (nm). The exposed surface has gloss measured at 60° of more than 80 gloss units (GU) in a machine direction of the skins layers and more than 60 GU in a cross direction of the skin layers.

In another aspect, the present subject matter provides a process for preparing a multilayer film structure. The process comprises providing a first mixture including from about 50% to about 95% by weight of at least one propylene homopolymer or copolymer or a blend of at least one propylene homopolymer and at least one propylene copolymer, and from about 5% to about 50% by weight of at least one ethylene polymer. A second mixture is provided that includes from about 70% to about 99.9% by weight of at least one propylene polymer, and from about 0.1% to about 30% by weight of at least one ethylene polymer, or from about 0.1% to about 25% by weight of at least one propylene polymer, and from about 75% to about 99.9% by weight of at least one ethylene polymer. The first and second mixtures are coextruded such that the first mixture is extruded as a core layer and the second mixture is extruded as a first skin layer and a second skin layer. The core layer is positioned between the first and second skin layers to thereby provide a coextruded multilayer film. The coextruded multilayer film is stretch oriented in a machine direction.

In still another aspect, the present subject matter provides a combination comprising a substrate defining a surface, and an adhesive label attached to the surface of the substrate. The adhesive label includes a coextruded machine direction oriented multilayer film structure, which includes a core layer, a first and second skin layer, and an adhesive layer. The core layer has a first side and a second side opposite from the first side. The core layer includes from about 50% to about 95% by weight of a propylene component, and from about 5% to about 50% by weight of an ethylene component. The first skin layer is positioned on the first side of the core layer and the second skin layer is positioned on the second side of the core layer. Each of the first and second skin layers comprise i) from about 70% to about 99.9% by weight of at least one propylene polymer, and from about 0.1% to about 30% by weight of at least one ethylene polymer, or ii) from about 0.1% to about 25% by weight of at least one propylene polymer, and from about 75% to about 99.9% by weight of at least one ethylene polymer. The adhesive layer attaches the second skin layer to the surface of the substrate. The first skin layer includes an exposed surface opposite from the core layer, the exposed surface having an average surface roughness (Sq) as measured by the root mean square height of the exposed surface of less than about 170 nanometers (nm).

In still another aspect, the present subject matter provides a method of labeling a substrate. The method includes providing a substrate comprising a surface and providing an adhesive label including a core layer, first and second skin layers, and an adhesive layer. The core layer has a first side and a second side opposite from the first side, and includes from about 50% to about 95% by weight of a propylene component, and from about 5% to about 50% by weight of at least one ethylene component. The first skin layer is positioned on the first side of the core layer and the second skin layer being positioned on the second side of the core layer. Each of the first and second skin layers comprises i) from about 70% to about 99.9% by weight of at least one propylene polymer, and from about 0.1% to about 30% by weight of at least one ethylene polymer, or ii) from about 0.1% to about 25% by weight of at least one propylene polymer, and from about 75% to about 99.9% by weight of at least one ethylene polymer. The adhesive layer is on a side of the second skin layer opposite from the core layer. The first skin layer includes an exposed surface opposite from the core layer, the exposed surface having an average surface roughness (Sq) as measured by the root mean square height of the exposed surface of less than about 170 nanometers (nm). The method includes contacting the adhesive layer to the surface of the substrate to thereby adhere the adhesive layer to the substrate.

As will be realized, the subject matter described herein is capable of other and different embodiments and its several details are capable of modifications in various respects, all without departing from the claimed subject matter. Accordingly, the drawings and description are to be regarded as illustrative and not restrictive.

BRIEF DESCRIPTION OF THE DRAWINGS

These, as well as other features, aspects, and advantages of the present subject matter, will be more completely understood and appreciated by referring to the following more detailed description of the exemplary embodiments of the present subject matter in conjunction with the accompanying drawings.

DETAILED DESCRIPTION OF THE EMBODIMENTS

Figure 1:
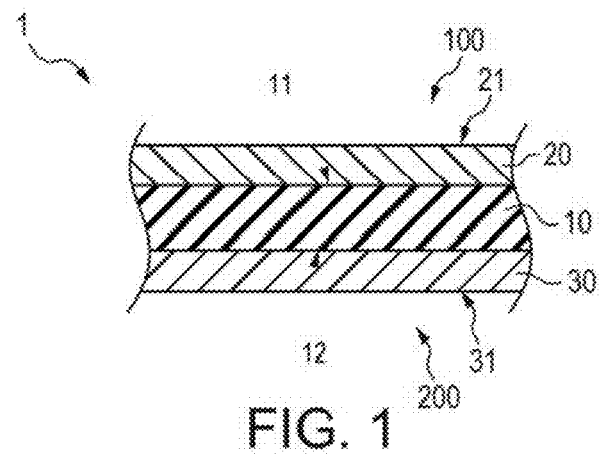
FIG. 1 is a schematic, cross-sectional view of a multilayer film structure in accordance with the present subject matter.

The present subject matter relates to specifically formulated and arranged machine-direction oriented coextruded multilayer films characterized as having improved conformability, die-cuttability, printability and/or dispensability. The films also have improved optical properties due to a reduction in surface roughness of the films. The low surface roughness results from specific formulations of skin layers, which also provides improved print aesthetics without requiring a top-coat such as a lacquer coating or other printing receptive layers or treatments.

It was observed that when an average surface roughness (Sq) of a film as measured by the root mean square height of an exposed surface exceeds about 150-170 nanometers (nm), optics of the film deteriorate and result in poor gloss when measured in the machine direction (i.e. "MD gloss") and cross direction (i.e. "CD gloss"), as well as high haze and reduced clarity for the film. Therefore, the present subject matter includes a non-top coated, optically clear multilayer film structure with an exposed surface having an average surface roughness value (Sq) as measured by the root mean square height of the exposed surface of less than 150-170 nm. The multilayer film structure is machine direction oriented to increase strength and reduce the thickness of the film structure, making it particularly suitable for dispensing at high speeds.

The low surface roughness of the MDO multilayer film, where Sq<170 nm, provides a gloss measured at 60° of greater than 60 gloss units (GU) in the CD direction of the film (CD gloss), and greater than 80 GU in the MD direction of the film (MD gloss). In one embodiment the low surface roughness of the MDO multilayer film, wherein Sq<150 nm, provides a CD gloss measured at 60° of greater than 70 GU and a MD gloss of grater than 90 GU. The low surface roughness and optical clarity of the films also produce a haze value of less than 15% at Sq<170 nm, or less than 10% at Sq<150 nm, and a transmittance of greater than 90% at film thicknesses of about 50 µm (2 mils).

Surface roughness of the film is controlled by using skin layers with incompatible PE-PP blends in specific amounts. As used herein, "incompatible" means the polymers in the blend are immiscible, or that free energy of interactions between the polymers is positive, thus preventing complete homogenous blending. Often, blends of incompatible polymers produce reduced transparency. By tailoring the PE-PP blended amounts in the skin layers, one can retain low average surface roughness values, such as Sq<170 nm, or Sq<150 nm. In one embodiment, the MDO multilayer films include a core layer having two skin layers on either side of the core layer.

The skin layers can comprise a mixture of polyethylene and polypropylene, wherein several embodiments include a PE content from 0.1-30% by weight (i.e. "wt %") and a corresponding PP content of from 70-99.9 wt %. In one aspect, the PE content is from 0.1-20 wt %, and the PP content is from 80-99.9 wt %. In several other embodiments, the PE content is from 75-99.9 wt %, and the corresponding PP content is from 0.1-25 wt %. In one aspect, the PE content is from 0.1-15 wt % and the PP content is from 85-99.9 wt %. In one embodiment, the skin layers can comprise a mixture of linear low density polyethylene (LLDPE) and polypropylene (PP).

In these PE-PP skin layer formulations, wherein the PE content is 0.1-30 wt % or 0.1-20 wt %, or alternatively from 75-99.9 wt % or 85-99.9 wt %, the average surface roughness (Sq) of less than 170 nm, or less than 150 nm for the skin layers is achieved, along with high film optics and good print aesthetics.

The MDO multilayer film structure will now be described in more detail with reference to the accompanying FIGS. 1-3.

As shown in FIG. 1, and in accordance with one embodiment, a multilayer film structure 1 includes a core layer 10 having two skin layers 20, 30 disposed on opposite sides thereof. A first skin layer 20 is disposed on a first side 11 of the core layer 10 and a second skin layer 30 is disposed on a second side 12 of the core layer 10. The first skin layer 20 on a first side 100 of the multilayer film structure 1 has an exposed surface 21 opposite from the core layer 10. The second skin layer 30 on a second side 200 of the multilayer film structure 1 has an exposed surface 31 opposite from the core layer 10. In one aspect, the exposed surface 21 of the first skin layer 20 and the exposed surface 31 of the second skin layer 30 have a surface roughness (Sq) of less than 170 nm, or less than 150 nm, or less than 125 nm.

Figure 2:
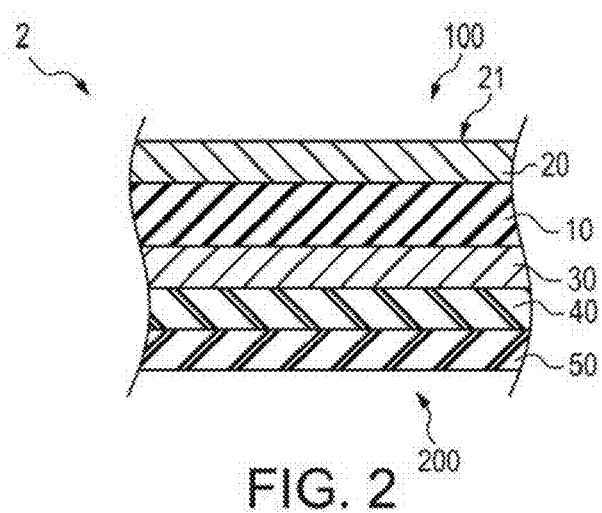
FIG. 2 is a schematic, cross-sectional view of another multilayer film structure in accordance with the present subject matter.

In another embodiment, and as shown in FIG. 2, a multilayer film structure 2 includes a core layer 10, a first skin layer 20, and a second skin layer 30 similar to that depicted in FIG. 1. As can be seen, the multilayer film structure 2 further includes an adhesive layer 50 on the second side 200 (i.e. adhesive side) of the multilayer film structure 2, with a tie layer 40 situated between the adhesive layer 50 and the second skin layer 30. In one aspect, the multilayer film structure 2 comprises an individual adhesive label or a labelstock.

Figure 3:
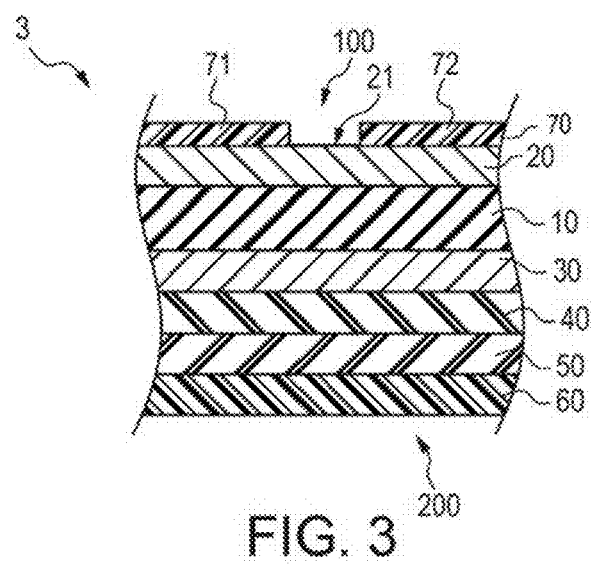
FIG. 3 is a schematic, cross-sectional view of still another multilayer film structure in accordance with the present subject matter.

In another embodiment, and as shown in FIG. 3, a multilayer film structure 3 includes a core layer 10, a first skin layer 20, a second skin layer 30, a tie layer 40, and an adhesive layer 50 similar to that depicted in FIG. 2. As can be seen, the multilayer film structure 3 further includes an indicia layer 70 on the first side 100 (i.e. "print side") of the multilayer film structure 3 and a release liner 60 covering the adhesive layer 50 on the second side 200 (i.e. "adhesive side") of the multilayer film structure 3.

The indicia layer 70 may include one or more portions 71, 72, wherein the first skin layer 20 includes an exposed surface 21 not covered by portions 71, 72 of the indicia layer 70. As will be understood, the exposed surface 21 of the first skin layer 20 defines a background, against which portions 71, 72 of the indicia layer 70 can provide high contrast or "pop" due to the low surface roughness of the exposed surface 21 of the first skin layer 20.

The release liner 60 covers the adhesive layer 50 and is used to protect the adhesive layer from contamination. In one aspect, the multilayer film structure 3 comprises an individual label, or a labelstock that can be die cut into a plurality of individual labels.

In several embodiments, the core layer 10 and the first and second skin layers 20, 30 are coextruded to form the multilayer film structures. The three layers 10, 20, 30 are then stretch oriented in the machine direction to attain a desired thickness of the MDO multilayer film structure, and to provide increased strength and rigidity in the machine direction for satisfactory dispensing at high speeds.

Core Layer

The core layer is used to provide stiffness and rigidity for the multilayer film structure in the machine direction, in order to allow the multilayer film structure to properly dispense from a carrier/web in a high speed automated dispensing process. The core layer has a first side and a second side opposite from the first side. In several embodiments, a first skin layer is positioned on the first side of the core layer and a second skin layer is positioned on the second side of the core layer.

The core layer may be stretch oriented in a machine and/or cross (i.e. transverse) direction as desired. In several embodiments, the core layer, along with the coextruded skin layers, is stretch oriented only in the machine direction and not in the cross direction.

The composition of the core layer is not specifically limited by the present subject matter, and can include any polymer(s) that can be stretch oriented to provide sufficient strength and stiffness as desired for high speed dispensing of labels from a release liner or carrier web. The core layer may be optically transparent, translucent, or opaque.

In several embodiments, the core layer is transparent and comprises a mixture of a propylene polymer component and an ethylene polymer component. The propylene component can include one or more propylene polymers, and can be included from about 50% to about 95% by weight of the core layer. The ethylene component can include one or more ethylene polymers and can be included from about 5% to about 50% by weight of the core layer.

In one embodiment, the core layer is made from a mixture comprising by weight, a propylene homopolymer at about 35-45% or about 40%, a random copolymer of propylene at about 45-55% or about 50%, and a polyethylene elastomer at about 5-15% or about 10%.

In another embodiment, the core layer is made from a mixture comprising from about 50% to about 95% by weight of at least one propylene homopolymer or copolymer or a blend of at least one propylene homopolymer and at least one propylene copolymer, and from about 5% to about 50% by weight of at least one ethylene polymer.

Skin Layers

The multilayer film structures can include one or more skin layers. In several aspects, the multilayer film structures include two skin layers—one on either side of the core layer as shown in FIGS. 1-3 for example. The one or more skin layers are incorporated in the MDO multilayer film structure to provide an exposed surface (e.g. exposed surfaces 21, 31 in FIG. 1) opposite from the core layer, that has an average surface roughness (Sq) of less than 170 nm, or less than 150 nm, or less than 125 nm. As such, an exposed surface of the skin layers provide increased gloss, reduced haze, and increased clarity for the MDO multilayer film structure, as well as improved print aesthetics for indicia applied directly thereto. Specifically formulating the skin layers to provide reduced surface roughness thus obviates the need for a lacquer or other print receptive layers or treatments to be applied to improve print aesthetics or surface gloss for the MDO multilayer film. As such, in several embodiments the MDO multilayer film structures are free of top-coats or overcoats, such as lacquers, further film layers, print-receptive coatings, or the like.

In several embodiments, the skin layers are coextruded with the core layer and then stretch oriented in the machine direction with the core layer. Even after being stretch oriented, the skin layers provide low surface roughness due to their specific ratio and composition of incompatible PP-PE in the blend. Accordingly, the skin layers provide better optical properties and improved print aesthetics for the MDO multilayer films.

In several embodiments, the skin layers comprise a mixture of a propylene polymer component comprising one or more propylene polymers, and an ethylene polymer component comprising one or more ethylene polymers. It has been discovered that when the ethylene content in the skin layers is between about 30-75 wt % for an incompatible PP-PE blend, the resulting extruded MDO skin layers undesirably display high haze, poor clarity, and low MD and CD gloss.

As such, the propylene component in one embodiment is included from about 0.1-25 wt % with a corresponding ethylene component included from about 75-99.9 wt %. In another embodiment, the propylene component is included from about 70-99.9 wt % with a corresponding ethylene component included from about 0.1-30 wt %.

In one aspect, the skin layers are made from a mixture comprising LLDPE from 0.1-30 wt % and polypropylene from 70-99.9 wt %. In another aspect, the layers are made from a mixture comprising LLDPE from 75-99.9 wt % and polypropylene from 0.1-25 wt %.

Propylene Component

The propylene component used in the skin layers and in the core layer can include one or more propylene homopolymers, one or more copolymers of propylene, and mixtures thereof.

The propylene homopolymers that may be utilized, either alone or in combination with a propylene copolymer, include a variety of propylene homopolymers such as those having melt flow rates (MFR) of from about 1 to about 20 g/10 min. as determined by ISO 1133 (230° C. and 2.16 kg).

In another embodiment, the melt flow rate of the propylene homopolymers that can be utilized in the present subject matter films may range from about 1 to about 15 g/10 min.

The propylene homopolymers utilized in the core layer and skin layers are not particularly limited by the present subject matter, and a number of useful propylene homopolymers are available commercially from a variety of sources. For example, SABIC PP 500P is a propylene homopolymer having a melt flow rate of 3.1 g/10 min., a density of 0.905 g/cm$^3$ and a DSC melting point of 160° C. Another useful propylene homopolymer is SABIC PP 520P, which has a melt flow rate of 10.5 g/10 min. and a density of 0.905 g/cm$^3$. Another useful propylene homopolymer is SABIC PP 575P which has a melt flow rate of 10.5 g/10 min., a density of 0.905 g/cm$^3$ and a DSC melting point of 167° C. Other commercially available propylene homopolymers that can be utilized in the films of the present subject matter include those listed in the following Table I, which is not an exhaustive list of suitable propylene polymers that can be used.

TABLE I

Commercial Propylene Homopolymers

| Commercial Designation | Company | Melt Flow Rate (g/10 min) | Density (g/cm$^3$) |
|---|---|---|---|
| WRD5-1057 | Union Carbide | 12.0 | 0.90 |
| DX5E66 | Union Carbide | 8.8 | 0.90 |
| 5A97 | Union Carbide | 3.9 | 0.90 |
| Z9470 | Fina | 5.0 | 0.89 |
| Z9470HB | Fina | 5.0 | 0.89 |
| Z9550 | Fina | 10.0 | 0.89 |
| 6671XBB | Fina | 11.0 | 0.89 |
| 3576X | Fina | 9.0 | 0.89 |
| 3272 | Fina | 1.8 | 0.89 |
| SF6100 | Montell | 11.0 | 0.90 |
| Stamylan P 17M10 | DSM | 10.0 | 0.90 |
| Stamylan P 17U10 | DSM | 3.0 | 0.90 |
| Appryl 3020 BTI | Atofina | 1.9 | 0.905 |
| Appryl 3030 FNI | Atofina | 3 | 0.905 |
| Appryl 3050 MNI | Atofina | 5 | 0.905 |
| Appryl 3060 MN5 | Atofina | 6 | 0.902 |
| Bormod HD905CF | Borealis | 8 | 0.905 |
| Moplen HP522J | Basell | 3 | 0.9 |

The propylene copolymers utilized in the core layer and skin layers are not particularly limited by the present subject matter and may comprise for example, copolymers of propylene and up to about 40% by weight of at least one alpha olefin selected from ethylene and alpha olefins containing from 4 to about 8 carbon atoms. Examples of useful alpha olefins include ethylene, 1-butene, 1-pentene, 4-methyl-1-pentene, 1-hexene, 1-heptene, and 1-octene. In one embodiment, the copolymers of propylene comprise copolymers of propylene with ethylene, 1-butene or 1-octene. The propylene-alpha-olefin copolymers may include random copolymers as well as block copolymers. Blends of the copolymers as well as blends of the copolymers with propylene homopolymers can be utilized in the film compositions of the present subject matter.

In one embodiment, the propylene copolymers are propylene-ethylene copolymers with ethylene contents of from 0.2% to about 20% by weight. With regard to the propylene-1-butene copolymers, 1-butene contents of up to about 15% by weight may be useful. Propylene-1-octene copolymers that are useful in the present subject matter may contain up to about 40% by weight of 1-octene.

A number of useful propylene copolymers are available commercially and some of these are listed in the following Table II.

TABLE II

Commercial Propylene Copolymers

| Commercial Name | Source | % Ethylene | % 1-Butene | Melt Flow Rate (g/10 mins) | Density (g/cm³) |
|---|---|---|---|---|---|
| DS4D05 | Braskem | — | 14 | 6.5 | 0.890 |
| DS6D20 | Braskem | 3.2 | — | 1.9 | 0.890 |
| DS6D81 | Braskem | 5.5 | — | 5.0 | NA |

Other useful propylene polymers also include P5C4K-089X, which is a random copolymer of propylene with a melt flow rate of 10 g/10 min, and a density of 0.9 g/cm³, or P4G4K-205, which is a homopolymer of propylene with a melt flow rate of 12 g/10 min, and a density of 0.9 g/cm³, both of which are available from Flint Hills Resources, Wichita, Kans.

In one embodiment, the amount of propylene homopolymer or copolymer, or blend thereof contained in the mixture used to form the skin layers may range from about 0.1-25 wt %. In other embodiments, the amount of propylene homopolymer or copolymer of blends thereof may range from about or from 0.1-15 wt %. In yet other embodiments, the amount of propylene homopolymer or copolymer or blends thereof may range from about 70-99.9 wt %. In another embodiment, the amount may range from about or 80-99.9 wt %.

In one aspect, the skin layers include a PP homopolymer at about 70-99.9 wt % and a PE component at about 0.1-30 wt %. In another aspect, the skin layers include a PP homopolymer at about 0.1-25 wt % and a PE component at about 75-99.9 wt %.

In one embodiment, the amount of propylene homopolymer or copolymer, or blend thereof contained in the mixture used to form the core layer may range from about 25-95 wt %. In other embodiments, the amount may range from about 30-95 wt %, or from about 40-95 wt % of propylene homopolymer or copolymer of blends thereof. In yet other embodiments, the amount of propylene homopolymer or copolymer or blends thereof may range from about 85-95 wt %. In another embodiment, the amount may range from about 88-92 wt %, or be about 90 wt %.

In one aspect, the core layer is made from a mixture that includes about 40 wt % of a PP homopolymer, 50 wt % of a PP random copolymer, and 10 wt % of a PE component.

Ethylene Component

A second component of the skin layers or core layer utilized in the present subject matter comprises at least one ethylene polymer. In one embodiment, the ethylene polymer is a low density polyethylene. The term "low density" as utilized in this application, includes polyethylenes having a density of about 0.935 g/cm³ or less. Polyethylenes having densities of from about 0.850 to about 0.935 g/cm³ generally are grouped under various grades of low density polyethylenes, as discussed below in more detail. The polyethylenes that are useful in the present subject matter can be characterized as having a melt flow rate in the range of from about 0.1 to about 20 g/10 min. In another embodiment, the polyethylenes useful in the subject matter are characterized as having a melt flow rate of from about 1 to about 10 or 25 g/10 min.

The low density polyethylenes useful in this subject matter are exemplified by the low density polyethylenes (LDPE), the linear low density polyethylenes (LLDPE), the very low density polyethylenes (VLDPE), the ultra low density polyethylenes (ULDPE) and the plastomers which are VLDPEs prepared by single site catalysts.

The low density polyethylenes (LDPE) may comprise homopolymers of ethylene or copolymers of ethylene with alpha olefins such as 1-butene, 1-hexene and 1-octene, or polar monomers such as vinyl acetate, methyl acrylate, or ethyl acrylate. LDPE homopolymers may have a density in the range of from about 0.920 to about 0.935 g/cm³. In one embodiment, the amount of comonomers polymerized with the ethylene does not exceed about 3.5 or 4% by weight.

Linear low density polyethylenes (LLDPE) are copolymers of ethylene and alpha-olefins. Although any alpha olefin containing from 3 to 20 carbon atoms can be used as a comonomer for LLDPE, the four most commonly used are 1-butene, 1-hexene, 4-methyl-1-pentene, and 1-octene. In one embodiment, the LLDPE is characterized as having a density in the range of from about 0.915 to about 0.925 g/cm³.

The very low density (VLDPE) and ultra low density (ULDPE) polymers can contain less than 4% of a comonomer and may be characterized as having a density of less than 0.915 g/cm³.

Very low density polymers prepared using single-site catalysts and referred to in the art as plastomers generally contain higher amounts of comonomer (i.e., up to about 25% by weight), and plastomers are generally characterized as having a density of about 0.912 g/cm³ or less.

Linear low density polyethylenes are available commercially. A number of LLDPEs are available from Dex Plastomers under the general trade designation "Stamylex". For example, Stamylex 1016LF is a 1-octene linear low density polyethylene having a melt flow rate of 1.1 g/10 min., a density of about 0.919 g/cm³ and a DSC melting point of 123° C., Stamylex 1026F is a 1-octene liner low density polyethylene having a melt flow rate of 2.2, a density of 0.919 g/cm3, and a DSC melting point of 123° C.; Stamylex 1046F is a 1-octene linear low density polyethylene having a melt flow rate of 4.4 g/10 min., a density of 0.919 g/cm³ and a DSC melting point of 122° C.; Stamylex 1066F is another 1-octene linear low density polyethylene that has a melt flow rate of 6.6 g/10 min., a density of 0.919 g/cm³ and a DSC melting point of 124° C.

Useful LLDPEs are also available from Borealis A/S (Denmark) under the trade designation Borstar®. For example, Borstar FB 4230 is a bimodal linear low density polyethylene film grade having a density of 0.923 g/cm³, a melting temperature (ISO 11357/03) of 124° C. and a melt flow rate (190° C./2.16 kg) of 0.4 g/10 min (ISO 1133); and Borstar FB 2310 is a high molecular weight polyethylene film grade having a density of 0.931 g/cm³, a melt flow rate (190° C./2.16 kg) of 0.2 g/10 min, and a melting temperature of 127° C. Useful LLDPE available from Dow Chemical Co. include Dowlex 2042E which is an ethylene/octene-1 copolymer having a density of 0.930 g/cm³ and a melt index (ASTM D1238) of 1 g/10 min; Dowlex 2035G having a density of 0.919 g/cm³ and a melt index of 6 g/10 min., and Dowlex SC2107, another ethylene/octene-1 copolymer. Other useful LLDPEs available from Dow include Dowlex 2036, Dowlex 2517, and Dowlex 2247.

An example of a useful LDPE is Himod™ FT 5270 from Borealis A/S. This material has a density of 0.927 g/cm³, a melt flow rate (190° C./2.16 kg) of 0.75 g/10 min, and a melting temperature of 115° C.

In one embodiment, the ethylene component comprises at least one medium or high density polyethylene. Medium density polyethylenes (MDPE) generally have a density between about 0.935 and 0.940 g/cm³. The term "high density polyethylene" or "HDPE" refers to a polyethylene having a density of about 0.940 to about 0.965 g/cm³.

Plastomers that may be utilized in the films of the present subject matter are very low density copolymers and terpolymers of ethylene with an alpha olefin, and these plastomers are characterized as having a density of about 0.912 g/cm$^3$ or less. These copolymers typically comprise from about 2 to about 30% or from about 5 to about 25% of the alpha olefin. The alpha olefins, which have been described above, include 1-butene, 1-pentene, 1-hexene, 1-heptene, 1-octene, 1-decene and 1 dodecene. Particularly useful alpha olefins include 1-butene and 1-hexene. An example of an ethylene terpolymer is ethylene-1-hexene-1-butene. These low density ethylene copolymers are obtained by copolymerization of ethylene with an alpha olefin using single-site metallocene catalysts. Such copolymers are available commercially from Exxon Mobil Chemical Company, Basell, and Dow Chemical Company.

Examples of useful ethylene plastomers include the EXACT series plastomers that are available from ExxonMobil Chemical Co. which include linear ethylene-butene copolymers such as EXACT 3024 having a density of about 0.905 g/cm$^3$ and a melt index of about 4.5 g/10 min.; EXACT 3027 having a density of about 0.900 g/cm$^3$ and a melt index of about 3.5 g/10 min.; EXACT 4011 having a density of about 0.888 g/cm$^3$ and a melt index of about 2.2 g/10 min.; EXACT 4049 having a density of about 0.873 g/cm$^3$ and a melt index of about 4.5 g/10 min; and ethylene-hexene copolymers such as EXACT 4150 having a density of about 0.895 g/cm$^3$ and a melt index of about 3.5 g/10 min.

Ethylene plastomers such as those sold by Dow Chemical Co. under the trade name Affinity also may be employed in the present subject matter. These plastomers are believed to be produced in accordance with U.S. Pat. No. 5,272,236, the teachings of which are incorporated herein in their entirety by reference. The ethylene plastomers include interpolymers of ethylene with at least one C3-C20 alpha-olefin and/or C2-C20 acetylenically unsaturated monomer and/or C4-C18 alpha-olefins.

Examples of these ethylene plastomers include Affinity PF 1140 having a density of about 0.897 g/cm$^3$, and a melt flow index of about 0.5 g/10 min; Affinity PF 1146 having a density of about 0.90 g/cm$^3$, and a melt index of about 1 g/10 min; Affinity PL 1880 having a density of about 0.902 g/cm$^3$, and melt index of about 1.0 g/10 min; Affinity EG 8100 having a density of about 0.87 g/cm$^3$, and a melt index of about 1 g/10 min.; Affinity EG 8150 having a density of about 0.868 g/cm$^3$, and a melt index of about 0.5 g/10 min.; Affinity EG 8200 having a density of about 0.87 g/cm$^3$, and a melt index of about 5 g/10 min.; and Affinity KC 8552 having a density of about 0.87 g/cm$^3$, and a melt index of about 5 g/10 min.

Examples of terpolymers are Exxon's Exact 3006 (an ethylene-butene-hexene terpolymer with a density of 0.910 g/cm$^3$ and M.F.I. of 1.2 g/10 min; Exact 3016 (an ethylene-butene-hexene terpolymer having a density of 0.910 g/cm$^3$ and a M.F.I. of 4.5 g/10 min; Exact 3033 (an ethylene-butene-hexene terpolymer having a density of 0.900 g/cm$^3$ (g/cc) and a M.F.I. of 1.2 g/10 min (g/10')); Exact 3034 (an ethylene-butene-hexene terpolymer having a density of 0.900 g/cm$^3$ (g/cc) and a M.F.I. of 3.5 g/10 min (g/10')); Dow Affinity PL 1840 (an ethylene-propylene-butylene terpolymer); Dow Affinity PL 1845 (an ethylene-propylene-butylene terpolymer); Dow Affinity PL 1850 (an ethylene-propylene-butylene terpolymer); and Exxon Mobil ZCE 2005 (an ethylene-propylene-butylene terpolymer).

In one embodiment, the ethylene component include polyethylenes having a melt flow rate (MFR) as determined by ISO 1133 in the range of about 0.1 to about 20, and more often, in the range of about 1 to about 10. In another embodiment, it is desirable for the polyethylene and the propylene homopolymer or copolymer to have about the same viscosity at extrusion conditions of temperature of 200°-240° C., and about the same shear rate in the extruder.

The amount of polyethylene included in the mixture used to form the skin layers may range from about 0.1-30 wt %. In other embodiments, the amount may range from about 0.1-25 wt % of polyethylene. In yet other embodiments, the amount of polyethylene or blends thereof may range from about 70-99.9 wt %. In another embodiment, the amount may range from about or 75-99.9 wt %.

In one aspect, the skin layers include a LLDPE at about 0.1-30 wt % and a PP component at about 70-99.9 wt %. In another aspect, the skin layers include a LLDPE at about 75-99.9 wt % and a PP component at about 0.1-25 wt %.

In one embodiment, the skin layers include at least one ethylene polymer which is chosen from a linear low density polyethylene having a density in the range of from about 0.915 to about 0.925 g/cm$^3$, a low density polyethylene having a density in the range of from about 0.920 to about 0.935 g/cm$^3$, a medium density polyethylene having a density in the range of from about 0.935 to about 0.940 g/cm$^3$, and a high density polyethylene having a density in the range of from about 0.940 to about 0.965 g/cm$^3$. In one aspect, the at least one ethylene polymer in the skin layers is an ethylene copolymer, wherein the ethylene copolymer includes an ethylene-butene copolymer, an ethylene-hexene copolymer, an ethylene-octene copolymer, or mixtures of two or more thereof with a density of about 0.915 to about 0.925 g/cm$^3$.

In one embodiment, the amount of polyethylene contained in the mixture used to form the core layer may range from about 5-75 wt %. In other embodiments, the amount may range from about 5-70 wt %, or from about 5-60 wt % of polyethylene. In yet other embodiments, the amount of polyethylene may range from about 5-15 wt %. In another embodiment, the amount may range from about 8-12 wt %, or may be 10 wt %.

In one aspect, the core layer includes about 10 wt % of a PE elastomer and about 90 wt % of a PP component.

In one embodiment, the propylene polymers utilized in the core layer are the same as the propylene polymers utilized in the skin layer(s), and in another embodiment, the propylene polymers in the various layers are different. Similarly, in one embodiment, the polyethylene utilized in the core layer may be the same as the polyethylene utilized in the skin layer(s), or the polyethylene utilized in the core layer may be different from the polyethylene utilized in the skin layer(s). Where different polyethylenes are utilized in the mixtures of the core layer and the mixtures of the skin layer(s), the stretching temperature utilized in the orientation of the multilayer film is at least the melting temperature of the lower melting polyethylene.

Any of the propylene polymers and the ethylene polymers described above as being useful in the multilayer films may be used in the core layer and the skin layer or skin layers of the multilayer films.

Additives

The machine direction oriented multilayer structures in accordance with the present subject matter may also contain various additives in the mixtures used to make either the skin layers or core layer. Useful additives may include nucleating agents, antiblocking agents, processing aids, and fillers for example.

In several embodiments, the skin layers include antiblocking agents to reduce the tendency of the films to block during windup, and which regulates the slip and anti-static properties of the multilayer films and allows a smooth unwinding from the reels. Any of the antiblocking agents described in the prior art as useful additives modifying the properties of polymer films, and in particular, olefin polymer films, can be included in the film formulations of the present subject matter.

Silicas with average particle sizes of about 2 microns or less can be utilized for this purpose, and small amounts (for example, 500 to 5000 ppm) of the fine silica may be used. Several antiblocking agents based on synthetic silica are available from A. Schulman, Inc., Akron, Ohio, under the general trade designation Polybatch®. These materials are antiblocking masterbatches and comprise free-flowing pellets comprising propylene homopolymers or copolymers and the synthetic silica. For example, Polybatch ABPP-05 comprises 5% synthetic silica in a propylene homopolymer; ABPP-10 comprises 10% synthetic silica in a propylene homopolymer; and ABPP-05SC comprises 5% synthetic silica and a random propylene copolymer. When the antiblocking agents are to be utilized in the preparation of the multilayer films of the present subject matter, several embodiments include the antiblocking agent only in the skin layer formulations. Useful antiblocking agents are Ampacet's Seablock 1 and Seablock 4.

In another embodiment, the film compositions may contain at least one processing aid. The processing aid acts to facilitate extrusion. These processing aids can include hexafluorocarbon polymers. An example of a commercially available processing aid that can be used is Ampacet 10919 which is a product of Ampacet Corporation identified as a hexafluoro carbon polymer. Another example of a useful processing aid is Ampacet 401198. The processing aids are typically used at concentrations of up to about 1.5% or form about 0.5% to about 1.2% by weight. In another embodiment, the processing aid is present in an amount up to about 0.25% by weight, and in one embodiment about 0.03% to about 0.15% by weight.

The film compositions used in the present subject matter also may contain other additives and particulate fillers to modify the properties of the various film layers. For example, colorants may be included in the film layers such as $TiO_2$, $CaCO_3$, etc. The presence of small amounts of $TiO_2$, for example, results in a white facestock.

In some embodiments, particularly where it is desired that the multilayer film is clear, the film layers are free of inert particulate filler material although very small amounts of particulate filler material may be present in the film layers due to impurities, etc. The term "free of" as used herein, is intended to mean that the film contains less than about 0.1% by weight of the particulate filler material and no particulate filler is intentionally added. Films that are free of particulate filler are particularly useful when it is desired to prepare a film that is clear and that may be characterized as having low haze, for example, less than 15%, less than 10%, or even less than 6% haze. Haze or clarity is determined using a BYK-Gardner haze-gloss meter as known in the art.

Multilayer Film Formation

The multilayer films may be prepared by means known to those skilled in the art. For example, the multilayer films useful in the present subject matter may be prepared by extrusion techniques, wherein the core layer and two skin layers are coextruded to form the multilayer film structures. Alternatively, the multilayer film structures can be prepared by laminating preformed layers together as known in the art.

In several embodiments, the multilayer films are formed by coextrusion at temperatures between 120° to about 290° C. or from about 150° to about 260° C. A useful procedure for preparing the multilayer films is coextrusion at 230° C. The coextruded multilayer films may be oriented in the machine direction in the manner and under the conditions as described above. That is, the stretch orientation of the multilayer film may be carried out at a temperature at about or above the melting temperature of the polyethylene(s) in the core and skin layer(s). If more than one type of polyethylene is included in the multilayer film, the film may be stretch oriented at a temperature at or above the highest melting polyethylene. The stretch oriented multilayer films may then be annealed or heat set.

In the coextruded MDO multilayer films as described, wherein the core layer contains from 50-90 wt % propylene polymer, such core layers are characterized as having higher stiffness than would be obtained if a lower amount of polypropylene were used. Also, in one embodiment, satisfactory adhesion of the skin layer(s) to the core layer is achieved without the need for an adhesive tie layer between the core layer and the skin layer(s).

The MDO multilayer films may range in thickness of from about 0.5 mils (12.7 µm) to about 3-5 mils (76.2-127 µm). In several embodiments, the multilayer film structures have a thickness of from about 2-3 mils (50.8-76.2 µm).

It has been discovered that such MDO down gauged films exhibit desirable stiffness and modulus values to provide films that are die-cuttable/dispensable in high speed dispensing, and yet are conformable when applied to a contoured substrate. In one embodiment, the films are stretch oriented in the machine direction only.

In one embodiment, the core layer makes up about 60-95% of the thickness of the multilayer film structure and the two skin layers each comprise about 2.5% up to about 20%, or up to about 7.5% of the thickness of the multilayer film structure. In one aspect, the skin layers each comprise about 5% of the thickness of the multilayer film structure. The thicknesses of the two skin layers can be the same or different. In one embodiment, a ratio of thicknesses of the first skin layer to the core layer to the second skin layer may range from about 20:60:20 or 7.5:85:7.5, to about 2.5:95:2.5, or may be about 5:90:5. In another aspect, a ratio of a thickness of the core layer to a combined thickness of the two skin layers is from about 60:40 or 85:15, to about 95:5, or about 90:10. In another embodiment, the thickness of the core layer is about 1.5 to 10 or more times the thickness of the individual or combined skin layers.

In certain embodiments, a tie layer may be present between a skin layer and the core layer. Alternatively or additionally, a tie layer may be present between the core layer and the first skin layer and also between the core layer and the second skin layer. In some embodiments, the composition of the tie layer between the core layer and the first skin layer may be the same as the composition of the tie layer between the core layer and the second skin layer, while in other embodiments, the composition of these tie layers may be the same. The composition of the tie layer is a blend of materials from both the skin layer, the core layer, and additional materials, including one or more olefin plastomers or elastomers having a density less that 0.915 g/cm³ and functionalized olefin copolymer. Without limitation, functionalized olefin copolymer may be, for example, ethylene vinyl acetate (EVA) or maleic anhydride functionalized olefin. The tie layer may be formed of about 75% to about 90% by weight of a blend of skin layer material and core layer material in combination with about 10% to about 25% by weight of a blend including one or more olefin plastomers or elastomers having a density less that 0.915 g/cm³ and functionalized olefin copolymer. The blend of skin layer material and core layer material may contain 50% to 100% material having the same composition as the corresponding core layer and up to 50% material having the same composition at the skin layer material. In embodiments where the first skin layer has a composition that is different from the composition of the second skin layer, the composition of the skin layer material blended into the tie layer material will correspond to the adjacent skin layer to the extent that such skin layer material is included in the tie layer material.

As noted above, the multilayer films utilized in the present subject matter may be oriented in the machine direction. In one embodiment, the machine direction oriented multilayer films are obtained by coextrusion of the core layer and two skin layers, followed by hot-stretching the multilayer film in the machine direction at a stretch ratio (i.e. the length of the multilayer film after stretching to the length before stretching) of at least 2:1. In other embodiments, the films are hot stretched at ratios of at least about 3:1, or at least 5:1, or at least about 6:1, or at least about 7:1, up to about 9:1 or 10:1. In one embodiment, the films are hot stretched at a ratio of 6:1 to about 9:1.

One feature of the present subject matter is that the hot stretching is carried out at a temperature within the range of from about the melting temperature of an ethylene polymer component used to make the core layer or the skin layers, up to the melting temperature of a propylene polymer component used to make the core layer or the skin layers. The term "melting temperature" as used herein refers to the DSC melting point of the polymers (DIN 53765). It has been discovered that when the hot stretching is conducted at about or above the melting temperature of the polyethylene component and below the melting temperature of the polypropylene component, improved die-cuttability and printability are obtained. Accordingly, typical stretching temperatures, depending upon the particular polyethylene used, may range from about 115° to 145° C. In other embodiments, stretching temperatures at or above about 125° C. are utilized. Stretching at such higher temperatures also generally results in a low shrinkage film (e.g., less than 2% shrinkage at 70° C.).

In one embodiment, after having been stretch oriented, the MDO multilayer films are then passed over heated annealing rolls where the MDO stretched films are annealed or heat-set. After the heat setting or annealing operation, the MDO multilayer film is then passed over chill rolls to complete the stretch and heat-set operations. The temperature used in the heat setting step (as with the stretching step) depends on the particular polymers used in the blends, and these temperatures may range from about 100° C. to about 150° C. The temperature used for the hot stretching and heat setting steps may be about the same, although in some instances, the temperature of heat setting is lower than the temperature used for heat stretching. In one embodiment, the temperature of the annealing rolls may be from about 100° C. to about 140° C., and in another embodiment, the annealing temperature may range from about 110° C. to about 135° C.

In one embodiment, the coextruded MDO multilayer films may be prepared by melting several mixtures of polymers as described herein, one mixture for the core layer and one or two mixtures for the two skin layers. The various melted polymer mixtures are then coextruded by simultaneous extrusion through a coextrusion die, and the multiple layers are adhered to each other in a permanently combined state to form the multilayer film structure.

The cast multilayer film structure may then be cooled and advanced by pull-off rollers to a hot-stretching station at which the stiffness of the multilayer film structure is increased by stretch orienting the film in the machine direction at the stretch ratios described herein. The stiffness of the multilayer film structure in the machine direction may allow for labels made therefrom to be properly dispensed at higher line speeds.

Stretching in the machine direction also increases the MD tensile modulus of the film, which contributes to dimensional stability and good print registration. Furthermore, stretching at a temperature at about or above the melting temperature of a polyethylene component of the film mixtures may improve die-cutting and printability of the multilayer film.

After stretching, the multilayer film then passes over annealing rollers at which the multilayer film is annealed or heat set, and finally, the multilayer film passes over the chill rollers to complete the hot stretch operation. The multilayer film may then be taken up in roll form.

One of the features of the relatively thin MDO multilayer films of the present subject matter, is that the stiffness of the thin films in the machine direction is sufficiently high to provide for improved properties such as high speed dispensability from a release liner or carrier, while the stiffness in the cross direction is sufficiently low so as to provide a die cut label that is conformable for application to a contoured substrate.

In one embodiment, the MD stiffness of the films is at least 20 mN, and in other embodiments, the MD stiffness is at least 25, or at least 28 or at least 30 or even 35 mN. In several embodiments, the stiffness of the films described above in the cross direction is much less than the machine direction. Thus, for example, in one embodiment, the MD stiffness is at least 2 to 3 times the CD stiffness. In other embodiments, the MD stiffness is from about 3 to about 5 times the CD stiffness.

The stiffness of the MDO multilayer films is determined using an L&W Bending Resistance Tester (Test Method: ISO 2493). In general, the relationship between the L&W stiffness in millinewtons (mN) to the Gurley stiffness as measured by TAPPI T543PM-84 is as follows: L&W=1.75× Gurley.

One of the advantages of using the multilayer structures of the present subject matter as labelstock and individually die-cut labels is that useful labels can be prepared that are thinner than many of the labels presently utilized in the art. Accordingly, it has been discovered that label stock and labels containing a multilayer film structure having a thickness of from 25 to 75 microns (1 to 3 mils) or from about 45 to about 65 microns are useful in high speed dispensing.

The films that have been described and that are useful in the facestocks and labels also are characterized as having a much higher modulus in the MD than in the CD. In one embodiment, the modulus of the films in the MD may be about 2500 MPa or higher, and the modulus in the CD as low as 400 or 500 MPa. In another embodiment, the MD modulus is at least 3.5 or at least 4 times the CD modulus. Modulus is Young's Modulus measured according to ISO 527-1 using a Zwick Z010.

The MDO multilayer films described herein may be utilized in the preparation of labelstock and individual labels, which also are characterized by having a low shrinkage. In one embodiment, the MDO multilayer films exhibit shrinkage of less than 3% or even less than 2% at 70° C. In one embodiment, the MDO multilayer films exhibit shrinkage of less than 1% at 70° C., after conditioning the MDO multilayer films at 23° C. and 50% relative humidity, the length of a film is measured before and after immersion in water at 70° C. for 2 minutes, and the shrinkage is calculated by the formula: (length before−length after/length before).

The MDO multilayer films, and labelstock and individual labels utilizing the MDO multilayer films, are characterized as having improved printability and print aesthetics, particularly with UV based inks, which are most commonly used to print pressure sensitive labels. Such improvements are achieved without reducing other desirable properties such as die-cuttability, shrinkage, etc., and do not require the use of a top-coat or print receptive layer.

Adhesive Layer

In several embodiments, an adhesive layer may be applied to one side of the MDO multilayer film structures in order to make an adhesive article. The adhesive article may be an individual label, or labelstock, which can be die-cut to form individual labels. Exemplary adhesive articles (e.g. a label or labelstock) are shown in FIGS. 2-3, wherein an adhesive layer 50 is applied to the second side 200 of the multilayer film structure.

As shown, a tie layer 40 is situated between the adhesive layer 50 and the second skin layer 30. The tie layer 40 helps to bond the adhesive layer 50 to the multilayer film structure and prevents separation therefrom. It will be understood however, that a tie layer 40 is not required and adhesive articles in accordance with the present subject matter may not have a tie layer between an adhesive layer and the second skin layer 30. In one embodiment, as shown in FIG. 3, the adhesive articles may have a release liner 60 covering the adhesive layer 50.

The adhesive layer 50 utilized in the present subject matter, such as illustrated in FIGS. 2-3, may be directly coated on the tie layer 40 (FIG. 2-3), or if no tie layer is included, coated directly on an exposed surface of the second skin layer 30. Alternatively, the adhesive may be first applied to a release liner 60 with which the core layer 10 and two skin layers 20, 30 are later combined. Upon removal of the release liner 60, the adhesive layer 50 is then transferred from the release liner 60 to the tie layer 40, or to the second skin layer if no tie layer is present.

Typically, the adhesive layer has a thickness of from about 0.4 to about 1.6 mils (10 to about 40 microns), but may be present at other thicknesses or coating weights.

The adhesives used in the adhesive layers 60 of the multilayer film structures are not particularly limited and may comprise one or more adhesives commonly available in the art for use in labelstocks. The adhesive can include various pressure sensitive adhesives, drying adhesives, contact adhesives, hot melt adhesives, reactive adhesives, or the like including combinations thereof. In one embodiment, the adhesive comprises a pressure sensitive adhesive (PSA). The PSA is not particularly limited and can include a variety of polymers or copolymers; for example, acrylic and methacrylic ester homo- or copolymers, butyl rubber-based systems, silicones, nitriles, styrene block copolymers, ethylene-vinyl acetate, urethanes, vinyl esters and amides, olefin copolymer materials, natural or synthetic rubbers, and the like. Other adhesives can be used; such as a polyurethane adhesive, a rubber adhesive, or the like.

In one aspect, the multilayer MDO film structure comprises a pressure sensitive adhesive label, capable of being applied to a substrate simply by pressing the bottom adhesive layer against a substrate.

The adhesive is not particularly limited as long as the adhesive is capable of sufficiently adhering the multilayer MDO film structure to a substrate. In one embodiment, the adhesive used is a flexible adhesive so as to maintain the flexibility of the MDO multilayer film structure.

In some applications, the adhesive may be a heat-activated adhesive or a hot-melt adhesive such as used for in-mold label applications, in which case there may be no need for a release liner such as is required when using a pressure-sensitive adhesive.

In one embodiment, the present subject matter relates to a die-cuttable and printable adhesive labelstock for use in making adhesive labels. The multilayer MDO films that have been described herein are utilized as facestock films in the labelstocks and labels of the present subject matter. Labelstock generally comprises the machine direction oriented multilayer films as a facestock, and an adhesive layer. The adhesive layer generally is in contact with and adhesively joined to the multilayer film structure, either directly or through the use of a tie layer. A protective release liner may be attached to the exposed surface of the adhesive layer.

In one embodiment, the core layer and the skin layers are machine direction oriented prior to contact with adhesive layer and/or tie layer which is adhesively joined at the second side 200 of the multilayer structure.

In one embodiment, the adhesive label stock is die-cut to form individual adhesive labels, which can then be used to label containers and the like in a high-speed label dispensing process.

Release Liner

The MDO multilayer films can optionally include a release liner as desired, wherein the release liner or carrier may be coated with a layer of adhesive for application to the multilayer film structure. When the multilayer MDO film is combined with the liner or carrier, the adhesive is joined to the multilayer MDO film to create an adhesive article. Later, the liner or carrier is removed to expose the adhesive, which now remains permanently joined to a second side of the multilayer MDO film structure. Alternatively, the adhesive may be coated directly on the multilayer MDO film structure prior to combining the structure with a release liner or carrier web The release liner may be a single- or multi-layer film material that is applied to cover the adhesive layer, for protecting the adhesive layer from premature exposure to contaminants or from being adhered to a substrate before intended. In one embodiment as depicted in FIG. 3, the release liner 60 covers the adhesive layer 50, which is intended to be used to adhere the multilayer film structure 3 to a substrate. The release liner can be removed from the multilayer film structure in order to expose the adhesive layer, whereby the adhesive layer can be placed in contact with a substrate and adhered thereto.

The release liner is not particularly limited and can include any material capable of being applied to and removed from the adhesive layer without degrading or damaging the adhesive layer, and without inhibiting bonding of the multilayer film structure to a substrate. The release liner can include one or more additives or coatings to enhance certain attributes of the release liner, such as silicone or Teflon coatings to decrease bonding with the adhesive layer.

Typical liner materials are super calendered kraft paper, glassine, clay coated kraft paper, machine finished kraft paper, machine glazed paper, biaxially oriented polyethylene terephthalate film, polypropylene film, polyethylene film, biaxially oriented polypropylene film, polyester, acrylic, nylon, cellulosic derivative, butylene; isobutylene; high, medium, low, and linear low density polyethylene; ethylene vinyl acetate; ethylene acrylic acid; ethylene methyl (meth) acrylate; ethylene butyl acrylate; polypropylene; ethylene/ propylene copolymers; and impact resistant ethylene/propylene copolymers and combinations thereof.

The MDO multilayer film structures may also include an indicia layer 70 (e.g. a printed layer) comprising one or more portions, such as indicia 71, 72 for example, on the print side 100 of the multilayer film structure. Due to the low surface roughness of the first skin layer, the indicia 71, 72, show up in high contrast against the exposed surface 21 of the first skin layer 20.

The indicia 71, 72 can be applied by any appropriate coating or printing technique including digital printing, screen printing, spraying, dip coating, dusting, electrostatic coating, vapor deposition, curtain coating, bar coating, knife coating, or any other coating or printing means known in the art and combinations thereof.

The material used to form indicia layer 70, including Indicia 71, 72, is not particularly limited by the present subject matter and can include for example, UV curable coatings, inks, paints, or the like which contain pigments, dyes, metal (e.g. metal flakes or metal pigments), or other coating or printing material known to be useful for labelstock, and combinations thereof. In one embodiment, the indicia layer comprises a metallized layer that may be produced by vacuum deposition or by other techniques.

Printed and die cut labels incorporating the MDO multilayer film structures of the present subject matter, may be applied to various substrates, for example containers. The substrates may comprise rigid substrates such as glass bottles or other rigid articles tending to have irregularities or contours in the surface and therefore requiring labels that are flexible and that closely adhere (conform) to the surface without bridging local surface depressions. Alternatively, the substrates may be soft, flexible substrates such as plastic containers requiring labels that conform when the container is flexed.

One important advantage of the multilayer machine direction oriented film structures described herein is their improved die-cuttability. It has been observed, for example, that die-cutting of individual labels from the present MDO multilayer film structures provides sharp and distinct cuts with full separation of the label from the matrix along the cut label edge being achieved at a lower die-cutting pressure. Furthermore, the cutting tool does not have to be as sharp when cutting the multilayer MDO films of the present subject matter. Failure to achieve a clean die-cut perimeter between the label and surrounding matrix can cause the matrix to break, in either the machine or cross directions, and remain with the label on the release liner. This defect will adversely affect the dispensing operation by applying a double label or label plus matrix strip(s) to the substrate.

Methods and Combinations

The present subject matter includes processes for preparing a multilayer film structure. The processes and methods generally include providing a first mixture for extruding the core layer. The first mixture can include from about 50% to about 95% by weight of a propylene component as described herein, for example at least one propylene homopolymer or copolymer or a blend of at least one propylene homopolymer and at least one propylene copolymer. The first mixture also includes from about 5% to about 50% by weight of at least one ethylene component as described herein, for example an ethylene homopolymer or copolymer.

The method includes providing a second mixture for extruding the skin layers. The second mixture can include from about 70% to about 99.9% by weight of at least one propylene polymer as described herein, and from about 0.1% to about 30% by weight of at least one ethylene polymer as described herein. Alternatively, the second mixture can comprise from about 0.01% to about 25% by weight of at least one propylene polymer, and from about 75% to about 99.9% by weight of at least one ethylene polymer.

The method includes coextruding the first and second mixtures such that the first mixture is extruded as a core layer and the second mixture is extruded as a first skin layer and a second skin layer. Coextrusion is performed such that the core layer is positioned between the first and second skin layers to thereby provide a coextruded multilayer film. The method includes stretch orienting the coextruded multilayer film in a machine direction.

The present subject matter also includes a combination comprising a substrate defining a surface, and an adhesive label attached to the surface of the substrate. The adhesive label includes a coextruded machine direction oriented multilayer film structure comprising a core layer, and a first and second skin layers as described herein. The first skin layer is positioned on the first side of the core layer and the second skin layer is positioned on the second side of the core layer. The adhesive layer attaches the second skin layer to the surface of the substrate. The first skin layer, and optionally also the second skin layer, includes an exposed surface opposite from the core layer. The exposed surface has an average surface roughness (Sq) as measured by the root mean square height of the exposed surface of less than about 170 nanometers (nm), or less than about 150 nm.

The substrate can comprise a container including a hollow body defining an interior for housing an associated material. The hollow body can be rigid or flexible. For example, the hollow body can be configured to dispense the material from the interior by squeezing the hollow body.

The present subject matter also includes a method of labeling a substrate including providing a substrate comprising a surface and providing a label. The label can be the MDO multilayer film structure as described herein including a core layer, two skin layers, and an adhesive layer. The method includes contacting the adhesive layer to the surface of the substrate to thereby adhere the adhesive layer to the substrate.

The methods may include applying indicia to the label or labelstock comprising the MDO multilayer film structure as described herein. Further, the methods may include utilizing a release liner and a tie layer as described herein.

EXAMPLES

The following examples in Tables III-VI illustrate some of the compositions that are useful in the preparation of the machine direction oriented multilayer films used in the present subject matter. Unless otherwise indicated in the following examples, in the claims, and elsewhere in the written description, all parts and percentages are by weight, temperatures are in degrees centigrade, and pressures are at or near atmospheric pressure.

The following examples in Table III-VI illustrate the preparation of the machine direction oriented multilayer film structures utilized in the present subject matter. The multilayer films are prepared utilizing the general procedure described herein utilizing coextrusion, stretch orientation, annealing temperatures, and the stretch ratios specified.

Several formulations of print side and adhesive side skin layers were prepared as seen in Table III and designated Examples 1-6. The formulations were coextruded on either side of a core layer comprising in each example 50 wt % propylene random copolymer, 40 wt % propylene homopolymer, and 10 wt % ethylene-octene copolymer. The multiple layers were prepared by coextrusion and were stretch oriented in the machine direction to a ratio of 5.6:1 and a thickness of about 2 mils. In all examples, the skin layers were non-top coated, i.e. they did not have a lacquer or other coating applied thereto that affects gloss.

TABLE III

Exemplary Skin Layer Compositions for MDO Multilayer Films

| | Print Side Skin Layer | | | | | Adhesive Side Skin layer | | | |
|---|---|---|---|---|---|---|---|---|---|
| | Polypropylene | | Polyethylene | | Antiblock | Polypropylene | | Polyethylene | Antiblock |
| Ex. | Type | wt % | Type | wt % | wt % | Type | wt % | Type | wt % | wt % |
| 1 | Homo-polymer (HPP) | 23 | LLDPE and Ethylene-Octene Copolymer (EOC) | 68 | 9 | HPP | 70 | LLDPE and EOC | 23 | 7 |
| 2 | — | — | LLDPE and EOC | 98 | 2 | HPP | 70 | LLDPE and EOC | 23 | 7 |
| 3 | — | — | LLDPE and EOC | 98 | 2 | HPP | 70 | LLDPE and EOC | 23 | 7 |
| 4 | — | — | LLDPE | 98 | 2 | HPP | 70 | LLDPE and EOC | 23 | 7 |
| 5 | — | — | LLDPE and EOC | 98 | 2 | HPP | 70 | LLDPE and EOC | 28 | 2 |
| 6 | Homo-polymer (HPP) | 23 | LLDPE and Ethylene-Octene Copolymer (EOC) | 68 | 9 | HPP | 70 | LLDPE and EOC | 23 | 7 |

As can be seen in Table III, Examples 1 and 6 have the same formulation and structure and represent comparative examples to the present subject matter skin layer. The multilayer MDO films of Examples 1-6 were evaluated for transmittance, haze, and clarity; and the print side and adhesive side skin layers were evaluated for MD and CD gloss. The results are shown below in Table IV.

TABLE IV

Performance of Examples 1-6

| | | | | Print Side | | Adhesive Side | |
|---|---|---|---|---|---|---|---|
| Ex. | Transmittance | Haze | Clarity | MD Gloss | CD Gloss | MD Gloss | CD Gloss |
| 1 | 92.5 | 15.4 | 87.7 | 80 | 57 | 82 | 49 |
| 2 | 92.9 | 7.1 | 92.3 | 100 | 82 | 100 | 70 |
| 3 | 92.5 | 8.4 | 91.5 | 103 | 70 | 88 | 75 |
| 4 | 92.3 | 9.0 | 89 | 103 | 73 | 101 | 65 |
| 5 | 92.6 | 8.7 | 89.4 | 103 | 77 | 102 | 50 |
| 6 | 91.5 | 14.8 | 81.3 | 84 | 42 | 87 | 59 |

As can be seen above in Table IV, Examples 2-5 showed reduced haze and increased gloss compared to Examples 1 and 6.

Several further formulations were prepared as seen below in Table V and designated Examples 7-21. Examples 7-21 were used for both the print side and adhesive side skin layers of MDO multilayer films. The formulations were coextruded on either side of a core layer comprising in each example 50 wt % random copolymer of propylene, 40 wt % propylene homopolymer, and 10 wt % ethylene-octene copolymer. The layers were prepared by coextrusion and were stretch oriented in the machine direction to a ratio of 5.6:1 and a thickness of about 2 mils. In all examples, the skin layers were non-top coated, i.e. they did not have a lacquer or other gloss enhancing coating applied thereto.

TABLE V

Exemplary Skin Layer Compositions for MDO Multilayer Films

| | Polypropylene | | Polyethylene | | |
|---|---|---|---|---|---|
| Ex. | Type | Polymer wt % | Type | Polymer wt % | Additive Type |
| 7 | RCP | 100 | — | 0 | Antiblock |
| 8 | — | 0 | LLDPE | 100 | Antiblock |
| 9 | RCP | 30 | LLDPE | 70 | Antiblock |
| 10 | RCP | 50 | LLDPE | 50 | Antiblock |
| 11 | RCP | 5 | LLDPE | 95 | Antiblock |
| 12 | RCP | 10 | LLDPE | 90 | Antiblock |
| 13 | RCP | 20 | LLDPE | 80 | Antiblock |
| 14 | HPP | 10 | LLDPE | 90 | Antiblock |
| 15 | HPP | 10 | LLDPE | 90 | Antiblock |
| 16 | HPP | 20 | LLDPE | 80 | Antiblock |
| 17 | HPP | 20 | LLDPE | 80 | Antiblock |
| 18 | HPP | 10 | LLDPE and EOC | 90 | Antiblock |
| 19 | HPP | 10 | LLDPE and EOC | 90 | Antiblock |
| 20 | HPP | 20 | LLDPE and EOC | 80 | Antiblock |
| 21 | HPP | 20 | LLDPE and EOC | 80 | Antiblock |

The multilayer MDO films of examples 7-21 were evaluated for transmittance, haze, and clarity; and the print side and adhesive side skin layers were evaluated for MD and CD gloss. Further, the print side surface roughness was evaluated. The results are shown below in Table VI.

TABLE VI

Performance of Examples 7-21

| | Surface Roughness | | | | Print Side | | Adhesive side | |
|---|---|---|---|---|---|---|---|---|
| Ex. | (Sq) in nm print side | Trans-mittance | Haze | Clarity | MD Gloss | CD Gloss | MD Gloss | CD Gloss |
| 7 | 14.1 | 99 | 0.9 | 93 | 119 | 119 | 120 | 118 |
| 8 | 71.6 | 98 | 2.4 | 92 | 116 | 108 | 113 | 102 |
| 9 | 216 | 94 | 24.2 | 92 | 72 | 37 | 75 | 52 |
| 10 | 191 | 92 | 18.6 | 88 | 80 | 39 | 79 | 47 |
| 11 | 67 | 92 | 3.5 | 97 | 104 | 96 | 104 | 90 |
| 12 | 113 | 92 | 4.1 | 97 | 107 | 93 | 109 | 92 |
| 13 | 128 | 92 | 6.6 | 97 | 109 | 78 | 106 | 80 |
| 14 | 87 | 92 | 3.2 | 98 | 111 | 102 | 114 | 100 |
| 15 | 65 | 92 | 3.4 | 98 | 114 | 101 | 108 | 100 |
| 16 | 135 | 92 | 9.4 | 98 | 84 | 70 | 89 | 71 |
| 17 | 95 | 92 | 6.7 | 99 | 94 | 85 | 93 | 80 |

TABLE VI-continued

Performance of Examples 7-21

| Ex. | Surface Roughness (Sq) in nm print side | Trans-mittance | Haze | Clarity | Print Side MD Gloss | Print Side CD Gloss | Adhesive side MD Gloss | Adhesive side CD Gloss |
|---|---|---|---|---|---|---|---|---|
| 18 | 130 | 92 | 4.5 | 96 | 104 | 74 | 101 | 77 |
| 19 | 91 | 92 | 3.8 | 98 | 107 | 94 | 106 | 89 |
| 20 | 112 | 92 | 3.8 | 98 | 110 | 91 | 105 | 85 |
| 21 | 175 | 92 | 14.2 | 98 | 73 | 59 | 74 | 60 |

As can be seen, Examples 9 and 10, which respectively included 70 wt % and 50 wt % polyethylene, showed significant surface roughness compared to the other examples, which included more than 80 wt % polyethylene (i.e. Examples 11-21) or less than 20 wt % polyethylene (i.e. Example 7 with 0 wt % polyethylene).

Figure 4:
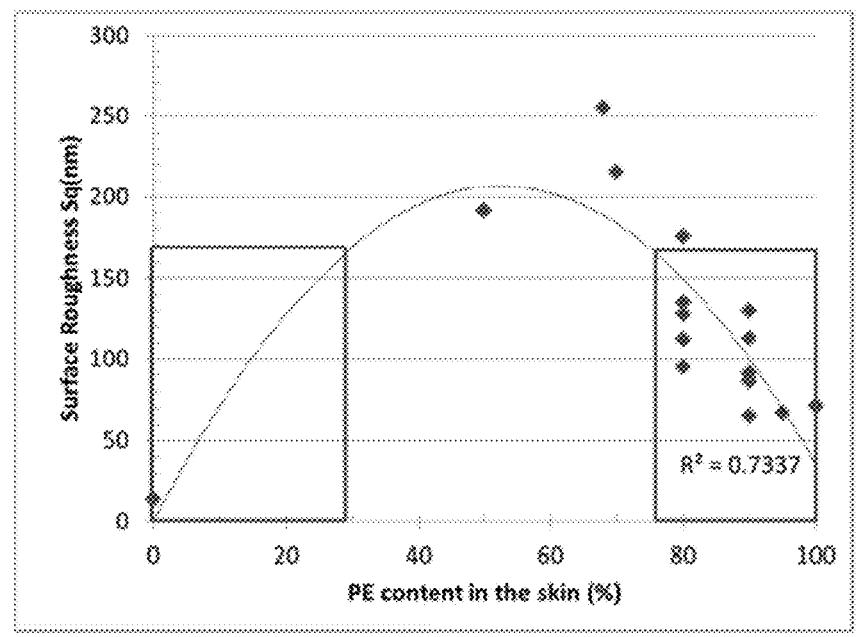
FIG. 4 is a graph depicting polyethylene content versus surface roughness of a skin layer in accordance with the present subject matter.

FIG. 4 is a graph prepared from data contained in Table VI, and shows the surface roughness (Sq) in nm relative to the wt % of the ethylene component in the print side skin layer. As can be seen in most examples that are located in the area inside the two boxes on the left and right in FIG. 4, when the ethylene content in the skin layer is above about 75 wt % or below 30 wt %, the surface roughness (Sq) is below about 170 nm, or below about 150 nm. As indicated in FIG. 4, when a regression analysis is performed on the data, the curve fits the data with a variance of about $R^2=0.7337$.

Figure 5:
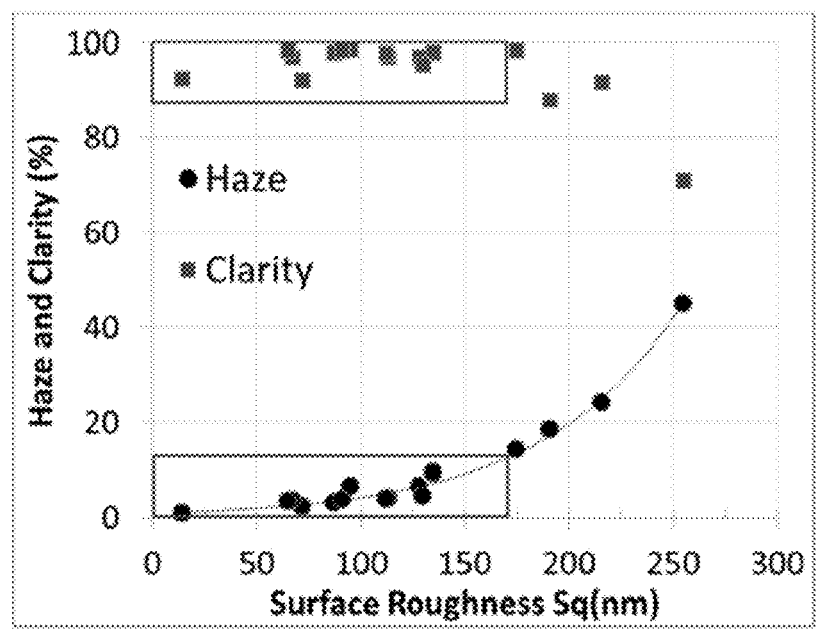
FIG. 5 is a graph depicting surface roughness versus haze and clarity of a skin layer in accordance with the present subject matter.

FIG. 5 is a graph prepared from data contained in Table VI, and shows the haze of the MDO multilayer films relative to the surface roughness (Sq) in nm in the print side skin layer and relative to clarity of the film. As can be seen in most examples inside the lower box in FIG. 5, when the surface roughness (Sq) is below about 170 nm then the haze (indicated with circles) is below about 15%, and when the Sq<150 nm, then the haze is below about 10%. Furthermore, as can be seen in most examples inside the upper box, when Sq<170 nm, the clarity (indicated with squares) is above about 85%. When a regression analysis was performed, the curved line fits the data points for haze with a variance of about $R^2=0.933$.

Figure 6:
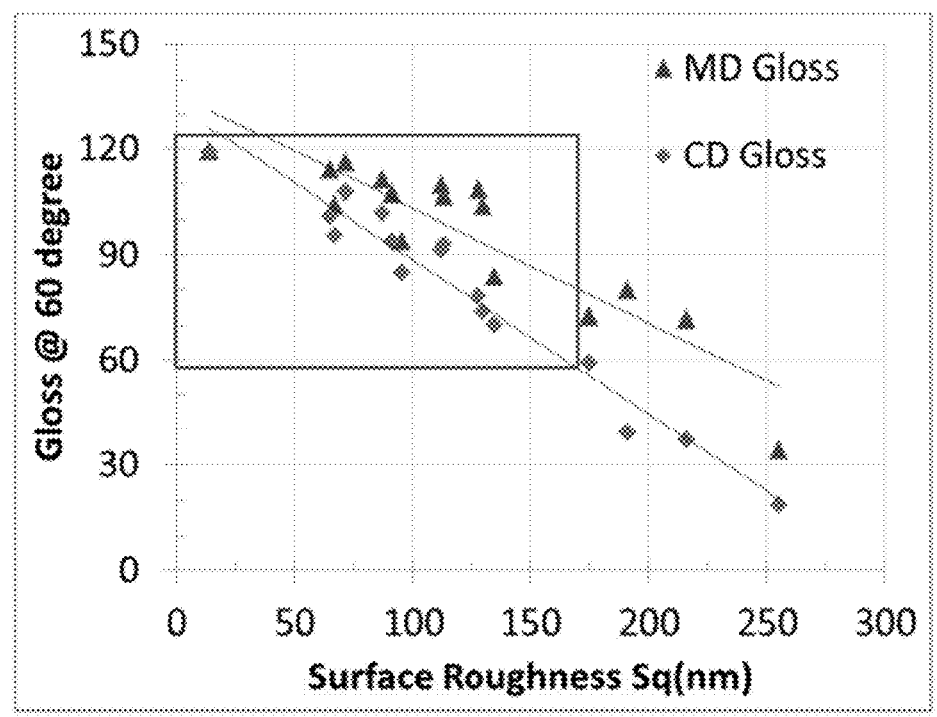
FIG. 6 is a graph depicting surface roughness versus gloss of a skin layer in accordance with the present subject matter.

FIG. 6 is a graph prepared from data contained above in Table VI, and shows the gloss measured at 60° of the MDO multilayer films relative to the surface roughness (Sq) in nm in the print side skin layer. The gloss in the machine direction (MD) is indicated with triangles, and the gloss in the cross direction (CD) is indicated with diamonds. As can be seen in most examples inside the box in FIG. 6, when the surface roughness (Sq) is below about 170 nm, then the MD gloss is above about 80 gloss units (GU) and the CD gloss is above about 60 GU, and when surface roughness is below about 150 nm, then the MD gloss is above about 90 GU and the CD gloss is above about 70 GU.

In a further evaluation, a convention non-top coated MDO multilayer film was prepared and evaluated using an optical profilometer, and compared to an inventive non-top coated MDO multilayer film prepared in accordance with the present subject matter. The two multilayer films were prepared by coextrusion and stretch orienting in the machine direction as generally described herein.

Figure 7:
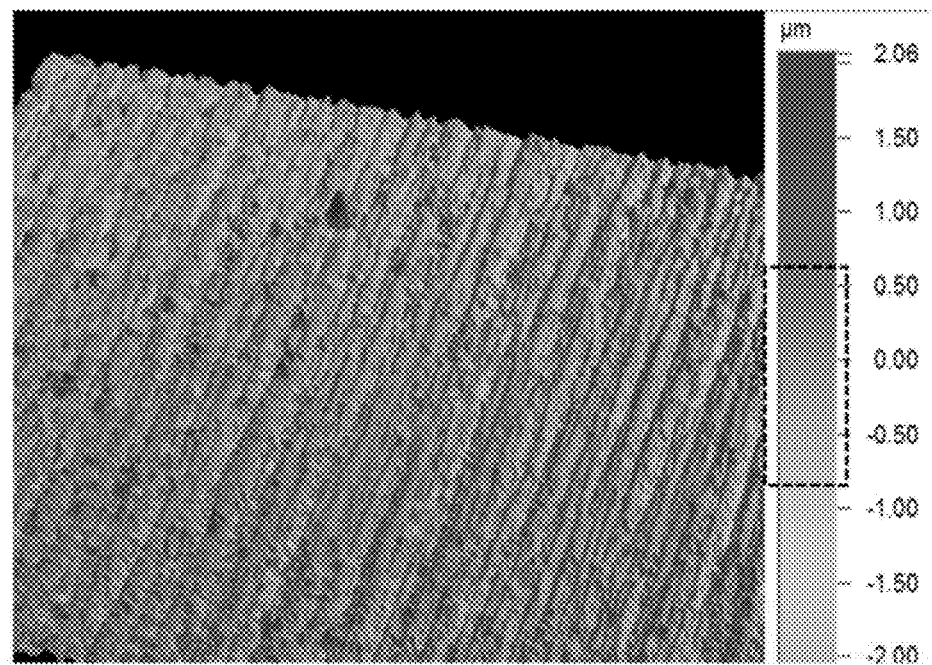
FIG. 7 is surface profile from an optical profilometer of a known MDO film.
Figure 8:
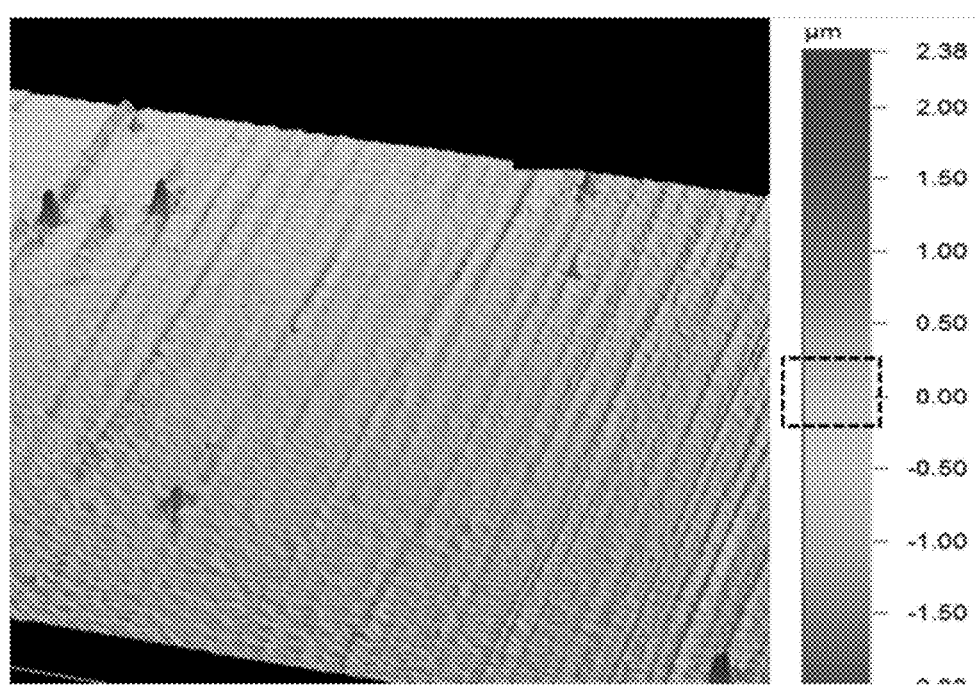
FIG. 8 is surface profile from an optical profilometer of a MDO multilayer film in accordance with the present subject matter.

FIG. 7 is a surface profile from an optical profilometer of the conventional non-top coated MDO multilayer film. As indicated by the hashed box in the legend at the right of FIG. 7, the conventional film has surface features ranging in height between about −0.80 μm and +0.60 μm (i.e. a range of about 1400 nm). FIG. 8 is surface profile from an optical profilometer of the inventive non-top coated MDO multilayer film at the same magnification as FIG. 7. As indicated by the hashed box in the legend at the right of FIG. 8, the inventive film has surface features ranging in height between −0.25 μm and +0.25 μm (i.e. a range of about 500 nm), which are smaller than the surface features of the conventional MDO film of FIG. 7.

While the subject matter has been explained in relation to its embodiments, it is to be understood that various modifications thereof will become apparent to those skilled in the art upon reading the specification. Therefore, it is to be understood that the subject matter disclosed herein is intended to cover such modifications as fall within the scope of the appended claims. Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scopes of the claimed subject matter, as expressed in the appended claims.

What is claimed is:

1. A coextruded multilayer film structure comprising:
   a core layer including a mixture of polypropylene and polyethylene, the core layer having a first side and a second side opposite from the first side;
   a fist skin layer positioned on the first side of the core layer and a second skin layer positioned on the second side of the core layer, each skin layer including at least one propylene polymer and at least one ethylene polymer;
   wherein both skin layer have a surface opposite the core layer;
   wherein the skin layer surfaces opposite the core layer have (i) and average surface roughness (Sq) as measured by the root mean square height of the surface opposite the core layer of less than about 170 nanometers (nm) and (ii) gloss measured at 60° of more than 80 gloss units (GU) in a machine direction of the skins layers and more than 60 GU in a cross direction of the skin layers,
   wherein at least one of the first skin layer and second skin layer include at least one propylene polymer from about 0.1% to about 25% by weight and at least one ethylene polymer from about 75% to about 99.9% by weight, and
   wherein the multilayer film is oriented in the machine direction.

2. The multilayer film structure of claim 1, wherein the multilayer film exhibits a haze of less than 15%.

3. The multilayer film structure of claim 1, wherein the multilayer film is non-top coated.

4. The multilayer film structure of claim 1, wherein each of the first skin layer and second skin layer includes at least one propylene polymer from about 0.1% to about 25% by weight and at least one ethylene polymer from about 75% to about 99.9% by weight.

5. A coextruded multilayer film structure comprising:
a core layer including a mixture of polypropylene and polyethylene, the core layer having a first side and a second side opposite from the first side;
a first skin layer positioned on the first side of the core layer and a second skin layer positioned on the second side of the core layer, each skin layer including at least one propylene polymer and at least one ethylene polymer;
wherein both skin layers have a surface opposite the core layer;
wherein the skin layer surfaces opposite the core layer have (i) an average surface roughness (Sq) as measured by the root mean square height of the surface opposite the core layer of less than about 170 nanometers (nm) and (ii) gloss measured at 60° of more than 80 gloss units (GU) in a machine direction of the skins layers and more than 60 GU in a cross direction of the skin layers,
wherein the multilayer film is oriented in the machine direction,
wherein the multilayer film exhibits a haze of less than 15%, and
wherein the multilayer film is non-top coated.

6. The multilayer film structure of claim 5 wherein at least one of the first skin layer and second skin layer include at least one propylene polymer from about 70% to about 99.9% by weight and at least one ethylene polymer from about 0.1% to about 30% by weight.

7. The multilayer film structure of claim 5 wherein at least one of the first skin layer and second skin layer include at least one propylene polymer from about 0.1% to about 25% by weight and at least one ethylene polymer from about 75% to about 99.9% by weight.

8. The multilayer film structure of claim 7, wherein the multilayer film structure has less than 15% haze at a thickness of about 50 μm (2 mils).

9. The multilayer film structure of claim 7, wherein the multilayer film structure has greater than 90% transmittance at a thickness of about 50 μm (2 mils).

10. The multilayer film structure of claim 5, wherein the core layer comprises:
from about 50% to about 95% by weight of at least one propylene homopolymer or copolymer or a blend of at least one propylene homopolymer and at least one propylene copolymer, and
from about 5% to about 50% by weight of at least one ethylene polymer.

11. The multilayer film structure of claim 5, wherein a ratio of thicknesses of the first skin layer to the core layer to the second skin layer is from about 20:60:20 to about 2.5:95:2.5.

12. The multilayer film structure of claim 5, wherein the at least one ethylene polymer in the skin layers is selected from the group consisting of a linear low density polyethylene having a density in the range of from about 0.915 to about 0.925 g/cm$^3$, a low density polyethylene having a density in the range of from about 0.920 to about 0.935 g/cm$^3$, and a medium density polyethylene having a density in the range of from about 0.935 to about 0.940 g/cm$^3$.

13. The multilayer film structure of claim 5, wherein the at least one ethylene polymer in the skin layers is an ethylene copolymer.

14. The multilayer film structure of claim 13, wherein the ethylene copolymer is selected from the group consisting of ethylene-butene copolymer, an ethylene-hexene copolymer, an ethylene-octene copolymer, and mixtures of two or more thereof.

15. The multilayer film structure of claim 14, wherein the at least one ethylene polymer in the skin layers has a density of about 0.915 to about 0.925 g/cm$^3$.

16. The multilayer film structure of claim 15, wherein the at least one ethylene polymer in the skin layers is a linear low density polyethylene.

17. The multilayer film structure of claim 5, wherein the ethylene polymer in the skin layers is a copolymer of ethylene and 1-octene.

18. The multilayer film structure of claim 5, wherein the at least one propylene polymer in the skin layers is a propylene homopolymer.

19. The multilayer film structure of claim 5, wherein the at least one propylene polymer in the skin layers is a copolymer of propylene and at least one alpha olefin selected from ethylene and alpha olefins containing from 4 to about 8 carbon atoms.

20. The multilayer film structure of claim 5, further including an adhesive layer positioned on the surface opposite the core layer of the second skin layer.

21. The multilayer film structure of claim 20, wherein the adhesive layer is a pressure sensitive adhesive.

22. The multilayer film structure of claim 20, further including a tie layer positioned between the adhesive layer and the second skin layer.

23. The multilayer film structure of claim 20, further including a release liner covering an exposed surface of the adhesive layer.

24. The multilayer film structure of claim 5, further including a printed layer on the surface opposite the core layer of the first skin layer.

25. The multilayer film structure of claim 24, wherein the printed layer contains metal flakes.

26. The multilayer film structure of claim 5 having L&W machine direction stiffness of at least about 20 mN.

27. The multilayer film structure of claim 5 having L&W machine direction stiffness of at least about 28 mN.

28. The multilayer film structure of claim 5 where a tie layer is disposed between the core layer and at least one of the first skin layer and second skin layer.

29. The multilayer film structure of claim 5, wherein each of the first skin layer and second skin layer includes at least one propylene polymer from about 70% to about 99.9% by weight and at least one ethylene polymer from about 0.1% to about 30% by weight.

30. The multilayer film structure of claim 5, wherein each of the first skin layer and second skin layer includes at least one propylene polymer from about 0.1% to about 25% by weight and at least one ethylene polymer from about 75% to about 99.9% by weight.

31. A process for preparing a multilayer film structure comprising:
providing a first mixture including
from about 50% to about 95% by weight of at least one propylene homopolymer or copolymer or a blend of at least one propylene homopolymer and at least one propylene copolymer and from about 5% to about 50% by weight of at least one ethylene polymer;
providing a second mixture including
at least one propylene polymer and at least one ethylene polymer;

coextruding the first and second mixtures such that the first mixture is extruded as a core layer and the second mixture is extruded as a first skin layer and a second skin layer, wherein the core layer is positioned between the first and second skin layers to thereby provide a coextruded multilayer film, stretch orienting the coextruded multilayer film in a machine direction, wherein both skin layers have a surface opposite the core layer;

wherein the skin layer surfaces opposite the core layer have (i) an average surface roughness (Sq) as measured by the root mean square height of the surface opposite the core layer of less than about 170 nanometers (nm) and (ii) gloss measured at 60° of more than 80 gloss units (GU) in a machine direction of the skins layers and more than 60 GU in a cross direction of the skin layers, wherein the multilayer film exhibits a haze of less than 15%, and wherein the multilayer film is non-top coated.

32. The process of claim 31, wherein at least one of the first skin layer and second skin layer include at least one propylene polymer from about 70% to about 99.9% by weight and at least one ethylene polymer from about 0.1% to about 30% by weight.

33. The process of claim 31, wherein at least one of the first skin layer and second skin layer include at least one propylene polymer from about 0.1% to about 25% by weight and at least one ethylene polymer from about 75% to about 99.9% by weight.

34. The process of claim 31, wherein the multilayer film structure has greater than 90% transmittance at a thickness of about 50 μm (2 mils).

35. The process of claim 31, wherein a ratio of a thickness of the core layer to a combined thickness of the two skin layers is from about 60:40 to about 95:5.

36. The process of claim 31, wherein the at least one ethylene polymer in the second mixture selected from the group consisting of a linear low density polyethylene having a density in the range of from about 0.915 to about 0.925 g/cm$^3$, a low density polyethylene having a density in the range of from about 0.920 to about 0.935 g/cm$^3$, and a medium density polyethylene having a density in the range of from about 0.935 to about 0.940 g/cm$^3$.

37. The process of claim 36, wherein the at least one ethylene polymer in the second mixture is an ethylene copolymer.

38. The process of claim 37, wherein the ethylene copolymer is selected from the group consisting of an ethylene-butene copolymer, an ethylene-hexene copolymer, an ethylene-octene copolymer, and mixtures of two or more thereof.

39. The process of claim 31, wherein the at least one ethylene polymer in the second mixture has a density of about 0.915 to about 0.925 g/cm$^3$.

40. The process of claim 31, wherein the at least one ethylene polymer in the second mixture is a linear low density polyethylene.

41. The process of claim 31, wherein ethylene polymer in the second mixture is a copolymer of ethylene and 1-octene.

42. The process of claim 31, wherein the at least one propylene polymer in the second mixture is a propylene homopolymer.

43. The process of claim 31, wherein the at least one propylene polymer in the second mixture is a copolymer of propylene and at least one alpha olefin selected from ethylene and alpha olefins containing from 4 to about 8 carbon atoms.

44. The process of claim 31, further including applying an adhesive layer to a side of the second skin layer opposite from the core layer.

45. The process of claim 44, wherein the adhesive layer includes a pressure sensitive adhesive.

46. The process of claim 44, further including applying a tie layer between the adhesive layer and the second skin layer.

47. The process of claim 44, further including applying a release liner to an exposed surface of the adhesive layer.

48. The process of claim 31, further including applying a printed layer on a side of the first skin layer opposite from the core layer.

49. The process of claim 48, wherein the printed layer includes a metallized printed layer.

50. The process of claim 25, wherein the coextruded multilayer film is stretch oriented in the machine direction at a stretch ratio of from about 6:1 to about 10:1.

51. The process of claim 31, wherein a first tie layer is coextruded between the first skin layer and the core layer and a second tie layer is coextruded between the second skin layer and the core layer.

52. The process of claim 31, further comprising die-cutting the multilayer film structure to form individual adhesive labels.

* * * * *